United States Patent [19]

Numakura et al.

[11] 4,175,272
[45] Nov. 20, 1979

[54] VIDEO SIGNAL PROCESSING CIRCUITRY FOR COMPENSATING DIFFERENT AVERAGE LEVELS

[75] Inventors: Toshihiko Numakura, Kamakura; Jun Hirai, Tokyo, both of Japan

[73] Assignee: Sony Corporation, Tokyo, Japan

[21] Appl. No.: 937,095

[22] Filed: Aug. 28, 1978

[30] Foreign Application Priority Data

Aug. 30, 1977 [JP] Japan .................. 52-103999

[51] Int. Cl.$^2$ .................. H04N 5/84; H04N 5/14
[52] U.S. Cl. .................. 360/34; 358/174
[58] Field of Search ............. 360/33, 34; 358/8, 127, 358/160, 174

[56] References Cited

U.S. PATENT DOCUMENTS

| 3,483,318 | 12/1969 | Iwai | 360/34 |
|---|---|---|---|
| 3,610,819 | 10/1971 | Thompson | 360/34 |
| 3,614,308 | 10/1971 | Iwai | 360/34 |
| 3,651,339 | 3/1972 | Herrmann | 358/160 |
| 3,716,670 | 2/1973 | Lowry | 358/160 |
| 3,904,818 | 9/1975 | Kovac | 358/160 |
| 3,969,759 | 7/1976 | Amery | 358/127 |
| 4,001,496 | 1/1977 | Clemens | 358/127 |
| 4,038,688 | 7/1977 | Chow | 358/160 |

Primary Examiner—Jay P. Lucas
Attorney, Agent, or Firm—Lewis H. Eslinger; Alvin Sinderbrand

[57] ABSTRACT

Video signal processing circuitry for compensating a video signal having different average levels in alternate horizontal line intervals, such as in odd and even line intervals during a field or frame interval. A first average detector is operable during alternate ones of the line intervals, for example, during odd line intervals, for detecting the average level of the video signal in such alternate line intervals. A second average detector is operable during the remaining ones of the line intervals, for example, during the even line intervals, for detecting the average level of the video signal in such remaining line intervals. A compensating circuit is responsive to the difference between the detected average levels of the video signal in the alternate and remaining line intervals, respectively, for producing compensating signals. These compensating signals are combined with the video signal so as to minimize the difference between the average level of the video signal in successive line intervals.

9 Claims, 9 Drawing Figures

FIG.4C $S_1$ 
FIG.4D $S_2$ 

VIDEO SIGNAL PROCESSING CIRCUITRY FOR COMPENSATING DIFFERENT AVERAGE LEVELS

BACKGROUND OF THE INVENTION

This invention relates to video signal processing circuitry and, more particularly, to such processing circuitry which eliminates or minimizes the difference between the average levels in adjacent line intervals of a video signal.

In a video signal recorder, such as a video tape recorder (VTR) of the prior art, successive fields are recorded in parallel skewed tracks along a magnetic tape. In order to improve the recording density, the adjacent tracks are recorded without guard bands and, preferably, in partially overlapping relation. Typically, a composite color video signal is recorded by dividing this composite signal into its chrominance and luminance components. The chrominance component then is frequency-converted to a lower frequency band and the luminance component is frequency modulated onto a carrier in a higher frequency band. To eliminate undesired crosstalk between adjacent tracks during a subsequent reproducing operation, a pair of rotary recording heads having different azimuth angles is used. Because of the known principle of azimuth loss, a high frequency signal which is recorded by a magnetic head having one azimuth angle is substantially attenuated when reproduced by another magnetic head having a different azimuth angle. Thus, by recording the processed composite color video signal with heads having different azimuth angles, the higher frequency luminance component which is recorded in the next adjacent track will be substantially attenuated during signal reproduction. However, this principle of azimuth loss, although advantageously used to minimize crosstalk between the higher frequency luminance components, does not apply with respect to the lower frequency chrominance component. That is, azimuth loss provides a useful avoidance of crosstalk only for higher frequency signals. Since the chrominance component is frequency-converted to a lower frequency range, the chrominance component which is recorded in the next adjacent track will be picked up during a reproducing operation so as to introduce undesired crosstalk. To avoid this problem of crosstalk between the chrominance component recorded in adjacent tracks, different carrier frequencies are used for recording the chrominance component in successive tracks. The frequencies of these carriers are selected so as to be in interleaved relationship with each other. Thus, when the chrominance component recorded in a given track is reproduced, the crosstalk component of the chrominance component which is recorded in the next adjacent track also will be reproduced, but this crosstalk component will have a frequency spectrum which is interleaved with the frequency spectrum in the chrominance component reproduced from the given track. Then, a comb filter having nodes at the frequencies corresponding to the interleaved frequencies of the crosstalk chrominance component is used to filter out, or remove, that crosstalk. Thus, the composite color video signal can be recorded and satisfactorily reproduced from magnetic tape with high recording density.

As described in copending U.S. application Ser. No. 770,315, a further increase in recording density generally can be achieved by reducing the width of the parallel tracks. However, azimuth loss is inversely proportional to the width of the tracks. Consequently, if the width of the tracks is reduced, the amount of attenuation in the luminance crosstalk component which is reproduced from an adjacent track likewise is reduced. Hence, interference due to this crosstalk component results in an interference or beat signal having a frequency which differs from that of the luminance or chrominance signals which are reproduced from the scanned track; and this results in a beat or moire pattern on the image which is displayed from the reproduced video signals. Accordingly, it has been proposed in the aforementioned application to record the frequency modulated luminance component with different carriers having an interleaved relation in adjacent tracks. When the luminance component is reproduced and then demodulated, the crosstalk component will appear as an interfering or noise signal which is inverted in phase in successive line intervals. This noise signal of alternating phase will visually cancel in the video picture which is displayed from the reproduced luminance component and, thus, will not be perceived by a viewer.

In the recording operation of the aforementioned application, the carrier frequency upon which the luminance component is frequency modulated varies from one track to the next track by an odd multiple of one-half the horizontal frequency, or $(m+\frac{1}{2})f_H$, where m is an integer and $f_H$ is the line frequency, i.e., the frequency of the horizontal synchronizing signal. Accordingly, the frequency of the carrier upon which the luminance component is modulated is shifted from, for example, a lower frequency during the recording of one track to a higher frequency during the recording of the next adjacent track, and then back to the first-mentioned frequency during the recording of the third track, and so on. Since a field interval is recorded in each track, this shift in the carrier frequency is synchronized with the field interval rate. In one embodiment, two different bias voltages are added to the luminance component during alternate field intervals prior to the frequency modulation of the FM carrier by the luminance component. Consequently, a lower bias voltage is added to the luminance component during odd field intervals, that is, during the recording of odd tracks, and a higher bias voltage is added to the luminance component during even fields, that is, during the recording of even tracks. This shift in the bias voltage added to the luminance component results in a corresponding shift in the frequency of the FM carrier.

While the foregoing VTR operates successfully to record and reproduce composite color video signals from a magnetic tape with high recording density, a problem arises due to the fact that, in some instances when an incoming broadcast composite color video signal is received for recording, the average level of the video signal changes from one line interval to the next. That is, in each field (or frame) interval of the broadcasted composite color video signal, the average level of the video signal during even line intervals may be greater or less than the average level of the video signal during odd line intervals. This difference in the average level is present as a difference in the average level of the luminance component. The frequency modulator which is used to frequency modulate the luminance component onto the higher frequency carrier for recording is responsive to the average level of the luminance component. Of course, if this average level remains the same from one line interval to the next, then any change in the carrier frequency attributed to this average level will be the same in each line interval and, thus, the effects thereof will cancel. However, since the average level of the luminance component changes in alternate line intervals, that is, the average level changes from, for example, a relatively lower level during odd line intervals to a relatively higher level during even line intervals, this difference in the average level in succeeding line intervals results in a corresponding change in the frequency of the FM carrier. Thus, the frequencies of the FM carriers which are recorded in adjacent tracks no longer differ from each other by an odd multiple of one-half the horizontal line frequency. That is, the frequency spectra of the frequency modulated luminance components in adjacent tracks no longer exhibit the aforementioned interleaved relation. Consequently, the crosstalk component which appears as an interfering or noise signal in one line is not phase inverted in the successive line. Therefore, these noise signals will not visually cancel; but, rather, will be perceived as an undesired pattern by the viewer when the reproduced video signal is displayed on, for example, a video display device, such as a cathode ray tube.

A typical VTR is provided with a clamp circuit wherein the recorded video signal, and particularly the luminance component thereof, is clamped or referenced either to the tip of the horizontal synchronizing signal or to the pedestal level, depending upon the particular type of clamp circuit which is used. However, the clamp circuit has no effect upon the average level of the video signal. That is, even though such a clamp circuit is provided, the average level of the video signal still may alternate between relatively high and low levels from one line interval to the next. Thus, the clamp circuit is not effective in eliminating undesired interference patterns in the video picture which ultimately is displayed.

A typical VTR also includes an automatic gain control circuit which functions to control the level of the luminance component. However, this gain control circuit generally has a relatively high time constant in order to compensate for variations in the level of the luminance component which are reproduced from adjacent tracks. Hence, changes in the average level of the luminance component from one line interval to the next occur at a rate which is too rapid to be detected and compensated by the gain control circuit. Thus, although level differences from track-to-track, that is, level differences in succeeding field or frame intervals, can be eliminated, differences in the average level from line-to-line cannot.

A change in the average level of a broadcasted video signal from one line to the next will appear as an undesired pattern of stripes in the video picture which is reproduced therefrom. As discussed above, this noise pattern is produced when the broadcasted video signal first is recorded and then is reproduced to provide the displayed video picture. This noise pattern also is formed when the video picture is reproduced directly from the broadcasted video signal. Thus, if the average level of, for example, the luminance component during line intervals n, n+2, ... differs from the average level of the luminance component during line intervals n+1, n+3, ..., wherein n is an integer, the quality of the video picture which ultimately is reproduced therefrom is degraded.

OBJECTS OF THE INVENTION

Therefore, it is an object of the present invention to provide improved video signal processing circuitry which avoids the aforenoted problems.

Another object of this invention is to provide video signal processing circuitry to compensate a video signal which has different average levels in alternate horizontal line intervals.

A further object of this invention is to provide video signal processing circuitry which eliminates or substantially minimizes the noise stripe pattern which may appear in a reproduced video picture due to different average levels in alternate horizontal line intervals of a video signal.

An additional object of the present invention is to provide improved video signal processing circuitry which is readily adapted for use in a high density video signal recorder for compensating a video signal having different average levels in the odd and even horizontal line intervals thereof prior to the recording of that video signal.

It is yet another object of this invention to provide video signal processing circuitry for eliminating or substantially minimizing different average levels in the odd and even horizontal line intervals of the video signal even if a special control signal, such as a VIR signal, is provided in a particular horizontal line interval.

Various other objects, advantages and features of the present invention will become readily apparent from the ensuing detailed description, and the novel features will be particularly pointed out in the appended claims.

SUMMARY OF THE INVENTION

In accordance with this invention, video signal processing circuitry is provided to compensate a video signal having different average levels in alternate horizontal line intervals thereof, that is, different average levels in the odd and even line intervals. A first average detector is operable during alternate ones of the line intervals, such as during the odd line intervals, for detecting the average level of the video signal in such alternate line intervals. A second average detector is operable during the remaining ones of the line intervals, such as during the even line intervals, for detecting the average level of the video signal in such remaining line intervals. A compensating circuit is responsive to the difference between the detected average levels of the video signal in the alternate and remaining line intervals, respectively, that is, the difference between the detected average levels of the video signal in the odd and even line intervals, for producing compensating signals. These compensating signals are combined with the video signal so as to minimize the difference between the average level of the video signal in successive line intervals.

BRIEF DESCRIPTION OF THE DRAWINGS

The following detailed description, given by way of example, will best be understood in conjunction with the accompanying drawings in which:

FIGS. 4A-4E are waveform diagrams which are useful in understanding the operation of the present invention.

DETAILED DESCRIPTION OF SOME OF THE PREFERRED EMBODIMENTS

Figure 1:
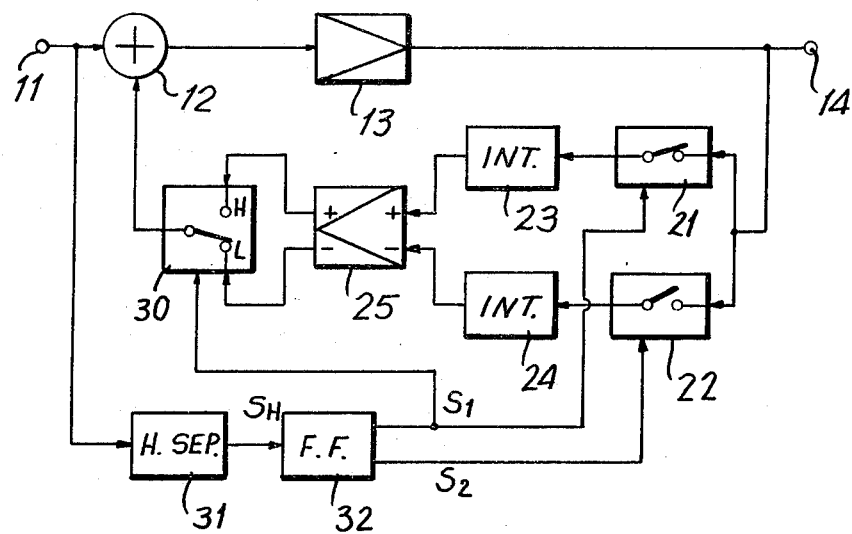
FIG. 1 is a block diagram of one embodiment of the present invention.

Referring now to the drawings, wherein like reference numerals are used throughout, and in particular to FIG. 1, there is illustrated one embodiment of the present invention wherein an incoming video signal, such as a video signal which is broadcasted, is compensated so as to eliminate, or at least substantially minimize, differences in the average level of the video signal from one to the next horizontal line interval. Typically, the illustrated video signal processing circuitry is connected to the output of the video detector which, normally, is provided in a video receiver. The illustrated video signal processing circuitry includes a first average detector comprised of a switching circuit 21 and an integrator 23, a second average detector comprised of a switching circuit 22 and an integrator 24, a compensating circuit comprised of a differencing circuit 25 and a change-over switch 30, and a combining circuit 12. As will be explained, the average detectors are mutually exclusively operable during alternate line intervals of the video signal under the control of switching signals which are generated by a horizontal synchronizing separator circuit 31 and a flip-flop circuit 32, which switching signals are synchronized with the horizontal synchronizing signal included in the incoming video signal.

An output terminal 11 is adapted to be supplied with the incoming video signal derived from the usual video detector. As mentioned above, this incoming video signal may be a typical broadcasted composite color video signal. Input terminal 11 is connected to combining circuit 12 for a purpose soon to be described. The output of the combining circuit is coupled to an output terminal 14 via an amplifier 13. The output of amplifier 13 also is fed back to the illustrated video signal processing circuitry. In particular, switching circuits 21 and 22 have their input terminals connected in common to the output of amplifier 13. Switching circuit 21 includes a control input adapted to be supplied with a switching signal $S_1$ produced by flip-flop circuit 32. The control input of switching circuit 22 is adapted to be supplied with switching signal $S_2$, also produced by flip-flop circuit 32. As is understood, switching signals $S_1$ and $S_2$ are complementary and, therefore, are 180° out of phase with respect to each other. Thus, when switching signal $S_1$ is of a condition whereby switching circuit 21 is operated, or closed, switching signal $S_2$ is of an opposite condition so as to open switching circuit 22. Conversely, when the condition of switching circuit $S_1$ is such that switching circuit 21 is opened, the condition of switching signal $S_2$ is such that switching circuit 22 is operated, or closed.

The output of switching circuit 21 is coupled to integrator 23; and, similarly, the output of switching circuit 22 is coupled to integrator 24. Integrators 23 and 24 each are conventional integrating circuits which, for example, may be RC integrators having relatively high time constants. That is, the time constant of each of integrating circuits 23 and 24 may be on the order of several line or field intervals. Consequently, a time-varying signal that is supplied to integrating circuit 23 or to integrating circuit 24 is averaged over a period of time by such integrating circuits. That is, the integrating circuit produces a time integral of the time-varying signal supplied thereto, this time integral being representative of the average level of the time-varying signal. The time constant of each of the integrating circuits is suitably high, as mentioned above, so that the time integral of the time-varying signal, that is, the average level of the time-varying signal supplied to the integrating circuit, is not affected by abrupt changes in the amplitude of the time-varying signal.

Differencing circuit 25 may comprise, for example, a differential amplifier having a pair of inputs coupled to the outputs of integrating circuits 23 and 24, respectively. The differential amplifier also includes a pair of outputs for deriving respective compensating signals. The inputs of differential amplifier 25 are identified as "+" and "−", respectively, This designation is adopted to represent that the average level signal which is supplied to the "−" input is subtracted from the average level signal which is supplied to the "+" input. The resultant signal, that is, the difference between the average level signals supplied to the "+" and "−" inputs of differential amplifier 25 is produced at the output thereof identified as "+". The inverted version of this difference signal is produced at the output of differential amplifier 25 identified as "−".

The difference signal produced at the "+" output of differential amplifier 25 is coupled to one input terminal, designated the H input, of change-over switch 30. The inverted version of this difference signal produced at the "−" output of differential amplifier 25 is coupled to the other input terminal of changeover switch 30, designated the L input. The output of the changeover switch, which is diagramatically represented as a movable contact selectively engageable with the H or L inputs thereof, is coupled to combining circuit 12. Thus, depending upon the condition of change-over switch 30, either a difference signal, which represents the difference between the average level signals supplied to differential amplifier 25 by integrating circuits 23 and 24, or the inverted version of this difference signal is supplied to the combining circuit. In the embodiment illustrated herein, combining circuit 12 is an adding circuit which adds either the difference signal or the inverted version of this difference signal, both these signals referred to as the compensating signals, to the incoming video signal which is supplied to input terminal 11. In another embodiment of this invention, combining circuit 12 is constituted by a subtracting circuit for subtracting the compensating signals from the incoming video signal.

Horizontal synchronizing separator circuit 31 may be of conventional construction and is coupled to input terminal 11 to receive the incoming video signal and to separate the horizontal synchronizing signal $S_H$ therefrom. Flip-flop circuit 32 is coupled to the output of horizontal synchronizing separator circuit 31 and is adapted to have its state changed in response to each horizontal synchronizing pulse which is separated from the incoming video signal. When the flip-flop circuit admits of its first state, switching signal $S_1$ is of a relatively higher level and switching signal $S_2$ is of a relatively lower level. When flip-flop circuit 32 is changed to its second state, switching signal $S_1$ undergoes a negative transition and is of a relatively lower level, while switching signal $S_2$ undergoes a positive transition and is of a relatively higher level. As mentioned above, switching signals $S_1$ and $S_2$ are supplied to the control signal inputs of switching circuits 21 and 22. Each switching circuit is closed, or operated, when the switching signal supplied thereto is of a relatively higher level. Switching signal $S_1$ additionally is supplied to change-over switch 30 for the purpose of selectively determining whether the change-over switch couples the difference signal, supplied to input H, or the inverted version of this difference signal, supplied to input L, to combining circuit 12.

Figure 4A:
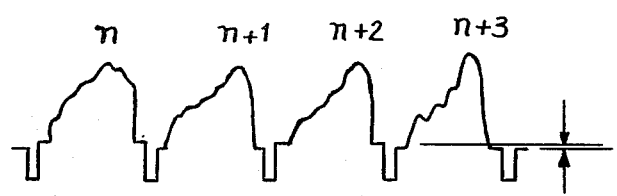
Figure 4B:

The operation of the video signal processing circuitry illustrated in FIG. 1 now will be described with reference to the waveform diagrams shown in FIGS. 4A–4E. Let it be assumed that the incoming video signal supplied to input terminal 11 is not subjected to compensation and, therefore, is transmitted through combining circuit 12 and amplifier 13 to output terminal 14 having the waveform shown in FIG. 4A. This waveform represents a portion of a field interval and depicts successive horizontal line intervals n, n+1, n+2 and n+3. It will be assumed that line intervals n, n+2, ... are odd line intervals, and line intervals n+1, n+3, ... are even line intervals. This assumption merely is for the sake of convenience and, if desired, the designation of odd and even line intervals can be reversed. It is further assumed that, in the event that the incoming video signal is a composite color video signal, the waveform shown in FIG. 4A represents the luminance component thereof.

The incoming video signal also is supplied to horizontal synchronizing separator circuit 31 which separates the horizontal synchronizing pulses from the composite video signal. These separated horizontal synchronizing pulses $S_H$ are shown by the pulse waveform of FIG. 4B. As is appreciated, the negative transition in each separated horizontal synchronizing pulse serves to change the state of flip-flop circuit 32. Thus, the flip-flop circuit is alternately set and reset to produce the switching signals $S_1$ and $S_2$ depicted in FIGS. 4C and 4D, respectively. Switching signal $S_1$ is of its relatively high level during alternate line intervals, for example, the odd line intervals n, n+2, ... etc. Switching signal $S_2$ is of its relatively high level during the remaining line intervals, that it, during the even line intervals n+1, n+3, ... etc.

Let it be assumed that the average level of the video signal, for example, the average level of the luminance component of the composite color video signal, during the odd line intervals differs from the average level of the video signal during the even line intervals. Let it be further assumed that the average level during the odd line interval is represented as H and is greater than the average level during the even line intervals which, in turn, is represented as L. When odd line interval n is received, switching signal $S_1$ admits of its relatively high level, as shown in FIG. 4C, and switching circuit 21 is closed. Consequently, line interval n is supplied to integrating circuit 23. The resultant time integral which is produced by the integrating circuit represents the average level of the video signal during line interval n. This average level, designated H, is supplied to the "+" input of differential amplifier 25.

During the next succeeding line interval, which is the even line interval n+1, switching signal $S_2$ admits of its relatively high level, as shown in FIG. 4D, to close switching circuit 22. At the same time, switching circuit 21 opens. Hence, line interval n+1 is supplied through switching circuit 22 to integrating circuit 24. The resultant time integral produced by the integrating circuit, designated L, is supplied to the "−" input of differential amplifier 25. It is appreciated that, because of the high time constants of integrating circuits 23 and 24, during each line interval that the video signal is not supplied to the respective integrating circuit, the output signal produced thereby during the preceding line interval is retained. That is, during even line intervals n+1, n+3, etc., the relatively high average level H still is supplied to the "+" input of differential amplifier 25 by integrating circuit 23. Similarly, during odd line interval n+1, n+2, etc., the relatively low average level L produced by integrating circuit 24 still is supplied to the "−" input of the differential amplifier. Hence, a substantially continuous DC level representing the relatively high average level of the odd line intervals is supplied to the "+" input of differential amplifier 25; and a substantially continuous DC level representing the relatively low average level L of the even line intervals is supplied to the "−" input of the differential amplifier.

The gain of differential amplifier 25 is selected such that the difference signal produced at the "+" output thereof is equal to $(H-L)/2$. The inverted version of this difference signal is produced at the "−" output of differential amplifier 25 as $(L-H)/2$.

When switching signal $S_1$ admits of its higher level, as shown in FIG. 4C, switching circuit 21 is closed to supply the odd line interval containing the higher average level H to integrating circuit 23. It is recognized that, at this time, the line interval of the incoming video signal supplied to input terminal 11 likewise contains this high average level H. Switching signal $S_1$ also is effective to operate change-over switch 30 to couple input L thereof to combining circuit 12. Thus, the inverted version of the difference signal, that is, $(L-H)/2$, is supplied to the combining circuit to be added to the incoming video signal. Thus, if combining circuit 12 is an adding circuit, then the average level of the video signal at the output of this adding circuit is equal to $H+(L-H)/2=(H+L)/2$.

At the next line interval, that is, the even line interval n+1, it is assumed that the average level of the incoming video signal is the relatively lower average level L. Switching signal $S_2$ now admits of its relatively higher level so as to close switching circuit 22, thereby supplying line interval n+1 to integrating circuit 24. At the same time, switching signal $S_1$ admits of its relatively lower level so as to control change-over switch 30 to couple input H thereof to combining circuit 12. Thus, when the line interval containing the lower average level L is received, the difference signal $(H-L)/2$ is added thereto. Thus, the average level of the video signal at the output of adding circuit 12 is equal to $L+(H-L)/2=(H+L)/2$.

From the foregoing, it is recognized that the average level of the compensated video signal, that is, the average level of the video signal at the output of combining circuit 12, is equal to $(H+L)/2$ both for the line interval containing the relatively higher average level, assumed herein to be the odd line intervals, and for the line intervals containing the relatively lower average level, assumed herein to be the even line intervals. Thus, in the compensated video signal, the average level does not fluctuate between high and low levels at successive line intervals. If the compensated video signal produced at output terminal 14 is displayed, the video picture derived therefrom will be substantially free of a noise stripe pattern which heretofore had been attributed to alternating high and low average levels in respective line intervals. Furthermore, if this compensated video signal is recorded by, for example, a VTR having high recording density, the fact that the average level in succeeding line intervals remains constant means that the frequency of the carrier onto which the luminance component is frequency modulated is not deleteriously shifted. Thus, in such a recording system, the frequency difference in the carriers recorded in adjacent tracks will be equal to an odd multiple of one-half the horizontal frequency, as is desired.

Figure 4E:

In the foregoing description, it has been assumed that combining circuit 12 is an adding circuit. Thus, when the line interval of the incoming video signal containing the higher average level is received at input terminal 11, change-over switch 30 is operated to supply the inverted version of the difference signal, that is, the compensating signal $(L-H)/2$, to the adding circuit. Conversely, when the line interval of the incoming video signal contains the lower average level, change-over switch 30 is operated to supply the difference signal, that is, compensating signal $(H-L)/2$, to the adding circuit. The output of change-over switch 30 is illustrated in FIG. 4E. However, as an alternative embodiment, compensating circuit 12 may comprise a subtracting circuit. In that event, the operation of change-over switch 30 is reversed. That is, when the line interval of the incoming video signal contains the relatively high average level, change-over switch 30 is operated to supply the difference signal, that is, compensating signal $(H-L)/2$, to the subtracting circuit. This compensating signal is subtracted from the video signal to produce a compensated average level equal to $H-(H-L)/2=(H+L)/2$. At the next line interval when the incoming video signal is provided with the lower average level, change-over switch 30 is operated to supply the inverted version of the difference signal, that is, compensating signal $(L-H)/2$, to the subtracting circuit. This compensating signal is subtracted from the video signal to produce the compensated average level which is equal to $L-(L-H)/2=(H+L)/2$.

It has been assumed in the foregoing discussion that the average level of the odd line intervals n, n+2, etc. is higher than the average level of the even line intervals n+1, n+3, etc. However, it should be readily appreciated that the embodiment shown in FIG. 1 operates to cancel or at least substantially minimize an alternating average level of the video signal even if the odd line intervals contain a lower average level than the even line intervals. Thus, by reason of the present invention, the average level contained in the video signal does not change at each succeeding line interval thereof.

In the embodiment shown in FIG. 1, differential amplifier 25 and change-over switch 30 can be replaced by a conventional balanced-type modulator.

In some instances, a special control signal may be inserted into a particular line interval of the broadcasted video signal. For example, a vertical interval reference (VIR) signal may be inserted into a predetermined line interval which is contained within the vertical interval. In the embodiment shown in FIG. 1, the presence of such a control signal may adversely affect the detected average level produced by one or the other of integrating circuits 23 and 24. This, in turn, may affect the compensating signals produced by differential amplifier 25, thus resulting in an improper average level compensation for the incoming video signal. This possible disadvantage is avoided by the embodiment shown in FIG. 2.

Figure 2:
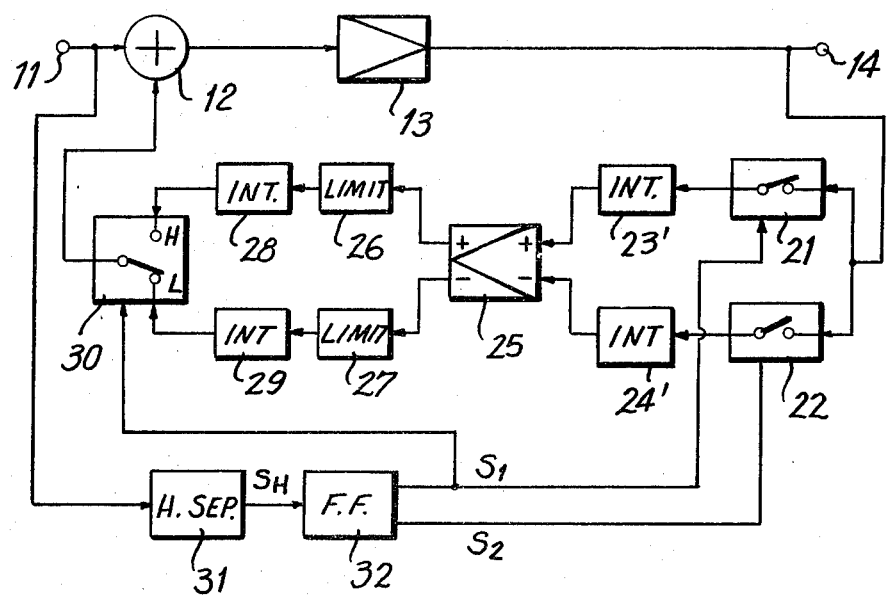
FIG. 2 is a block diagram of another embodiment of the present invention.

In FIG. 2, those elements which correspond to elements previously described with respect to FIG. 1 are identified by the same reference numerals. However, integrating circuits 23 and 24 are identified as 23' and 24' in FIG. 2 because the time constants thereof are selected to be relatively short, such as on the order of several line intervals. That is, the time constants of integrating circuits 23' and 24' are shorter than the time constants of corresponding integrating circuits 23 and 24. The embodiment of FIG. 2 further differs from that shown in FIG. 1 in that the "+" output of differential amplifier 25 is connected to the H output of change-over switch 30 via the series circuit formed of limiter 26 and integrating circuit 28. Similarly, the "−" output of differential amplifier 25 is connected to the L input of the change-over switch by the series circuit formed of limiter 27 and integrating circuit 29.

Since the time constants of integrating circuits 23' and 24' are selected to be relatively short, the detected average levels H and L which are produced by these integrating circuits may contain abrupt changes. Consequently, the difference signal $(H-L)/2$, as well as the difference signal $(L-H)/2$, produced at the "+" and "−" outputs of the differential amplifier likewise may contain abrupt changes. The purpose of limiters 26 and 27 is to limit the amplitudes of the difference signal and inverted version of the difference signal, respectively, produced by differential amplifier 25 so that these compensating signals do not exceed some predetermined amplitude. As an example, each limiter circuit may be formed of parallel, oppositely-poled diodes.

The time constants of integrating circuits 28 and 29 are selected to be relatively high, such as on the order of several field intervals. Thus, these integrating circuits detect the average levels of the compensating signals which, as is appreciated, may include relatively rapid variations therein. The signal supplied to the H input of change-over switch 30 by integrating circuit 28 is a DC signal which represents the difference between the high and low average levels $(H-L)/2$ in succeeding line intervals of the incoming video signal. The signal supplied to the L input of change-over switch 30 by integrating circuit 29 represents the inverted version of this difference, $(L-H)/2$. Thus, the embodiment shown in FIG. 2 functions in substantially the same manner as that of FIG. 1 in order to compensate for variations in the average level of the incoming video signal from one line to the next. However, in the FIG. 2 embodiment, proper compensation is carried out even if a special control signal, such as the VIR signal, is inserted into a particular line interval of the video signal.

While the embodiment of FIG. 2 functions properly to compensate for alternating average levels in succeeding line intervals of the incoming video signal, even in the presence of a VIR signal, the embodiment shown in FIG. 1 can be adapted to perform satisfactory compensation merely by preventing the VIR signal from being supplied to either of integrating circuits 23 and 24. For example, when the VIR signal is detected, both switching circuits 21 and 22 may be opened.

Figure 3:
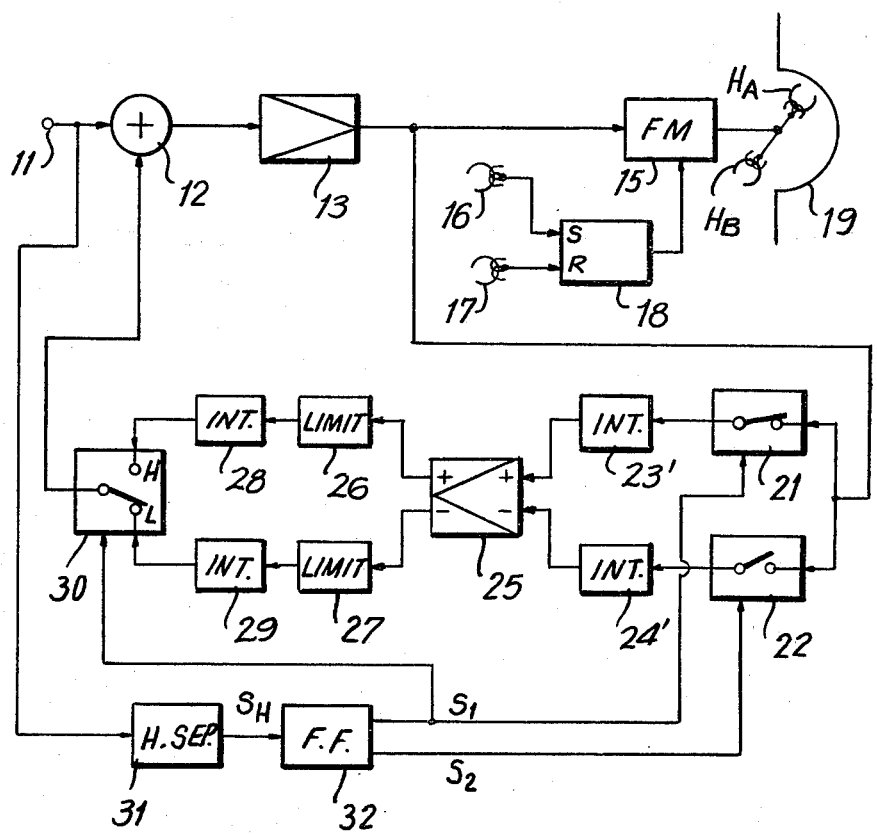
FIG. 3 is a block diagram of an embodiment of the present invention which is particularly adapted for use in a video signal recorder.

It is appreciated that the embodiment described previously with respect to FIGS. 1 and 2 may be provided in, for example, a television receiver. These embodiments also may be used in the recording section of a video signal recorder, such as a VTR, and are particularly advantageous when used in a recorder having high recording density. FIG. 3 is a block diagram of the embodiment shown in FIG. 2 incorporated into the recording section of a video signal recorder. The recorder may be of the type wherein the entire composite color video signal is used to frequency modulate a carrier and then is recorded. Alternatively, the recorder may be of the type wherein the luminance and chrominance components are separated from the composite color video signal, and then the luminance component is frequency modulated onto a carrier of higher frequency while the chrominance component is frequency-converted down to a lower frequency range. In FIG. 3, a frequency modulator 15 is coupled to the output of amplifier 13 and is intended to represent the frequency modulator of either of these types of recorders. Thus, frequency modulator 15 may frequency modulate a carrier with the entire composite color video signal or, alternatively, the frequency modulator may frequency modulate the carrier with only the luminance component of the composite color video signal.

If it is assumed that frequency modulator 15 is supplied with the luminance component of the composite color video signal, it is appreciated that this luminance component is, of course, compensated by the processing circuitry described hereinabove. The compensated, frequency modulated luminance component then is combined with the frequency-converted chrominance component and supplied to rotary transducers $H_A$ and $H_B$ for recording on magnetic tape 19. As disclosed in aforementioned copending application Ser. No. 770315, the frequency of the FM carrier is shifted between relatively lower and higher frequencies at the start of the scanning of successive tracks. That is, the frequency of the FM carrier which is recorded in one track differs from the frequency of the FM carrier which is recorded in the next adjacent track by an odd multiple of one-half the horizontal line frequency. A flip-flop circuit 18 supplies a suitable change-over control signal to frequency modulator 15 to achieve this frequency shift. For example, the frequency modulator may include a switching circuit which, under the control of the change-over signal, selectively adds either a higher or lower bias signal to the compensated luminance component which is supplied to the frequency modulator. The set and reset inputs of flip-flop circuit 18 are coupled to pulse generators 16 and 17, respectively, to receive pulse signals generated when transducer $H_A$ and then transducer $H_B$ scans tape 19. For example, a magnetic element may be provided on the drive shaft to which transducers $H_A$ and $H_B$ are mechanically coupled. Pulse generators 16 and 17 may comprise magnetic pick-up elements for generating set and reset pulses, respectively, when the magnetic element is sensed thereby. Thus, when transducer $H_A$ rotates into proper relation with tape 19, pulse generator 16 generates a pulse to set flip-flop circuit 18, thereby shifting the frequency of the FM carrier to higher (or lower) frequency. Then, when transducer $H_B$ rotates into proper relation with tape 19, pulse generator 17 supplies a reset pulse to flip-flop circuit 18, thereby resetting this flip-flop circuit to shift the frequency of the FM carrier to its lower (or higher) frequency. Thus, the compensated luminance component is recorded as a frequency modulated signal having different carrier frequencies in adjacent tracks, the frequency spectra of these luminance components being in interleaved relation with each other. Since the average level of the luminance component from one line interval to the next is compensated such that this average level remains substantially constant, there is no adverse effect thereby on the frequency of the FM carrier. Consequently, during signal reproduction, the crosstalk components of the luminance signal which are picked up from adjacent tracks will visually cancel when the reproduced video signal is displayed.

In the embodiment shown in FIGS. 1-3, the video signal processing circuitry which is used to compensate for alternating average levels in succeeding line intervals of the video signal is formed as a closed loop circuit. That is, the output of combining circuit 12, which is a compensated video signal, is fed back to the video signal processing circuitry. As an alternative embodiment, this video signal processing circuitry may be formed as an open loop circuit. That is, the incoming video signal may be supplied directly to switching circuits 21 and 22. Even in this open loop construction, the output of combining circuit 12 nevertheless will be a compensated video signal.

Figure 5:
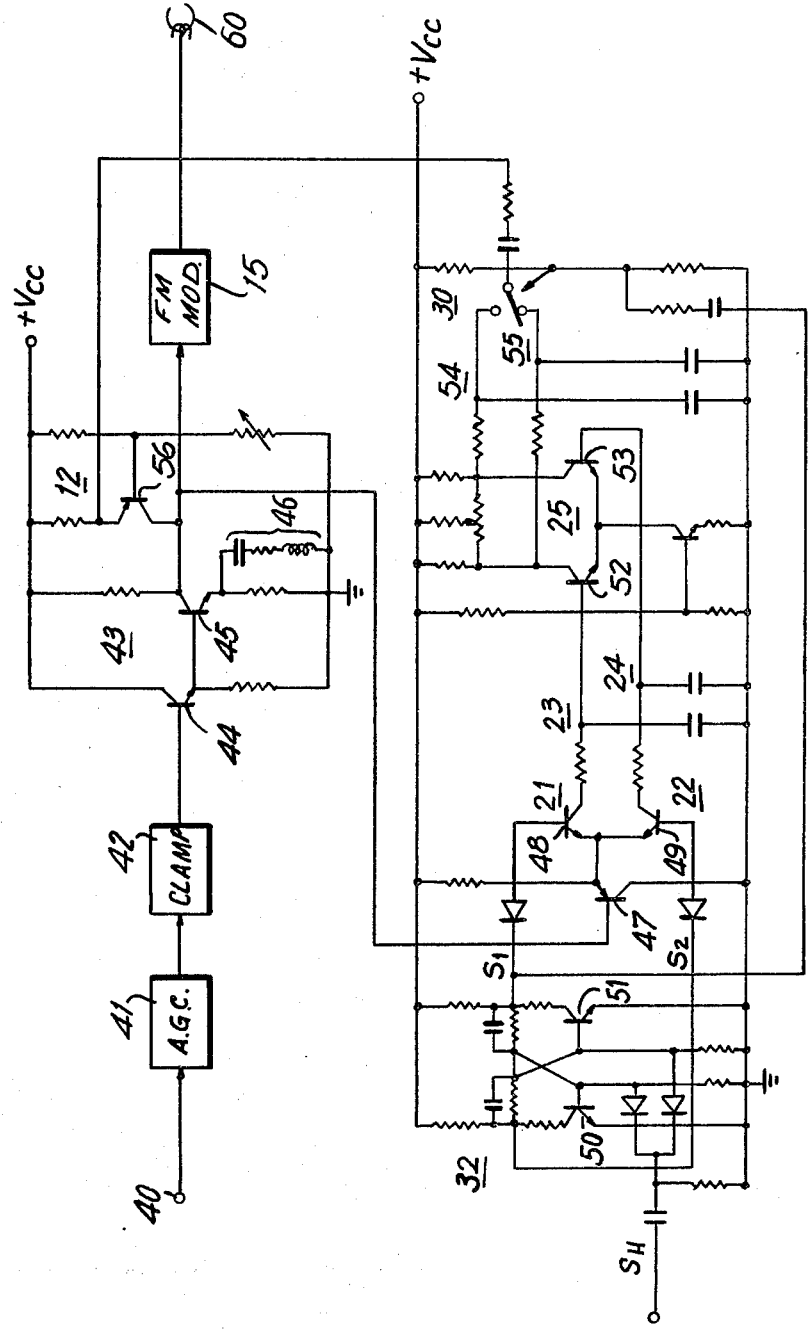
FIG. 5 is a schematic diagram of the embodiment shown in, for example, FIG. 3.

A schematic diagram of the embodiment illustrated in FIG. 3 is shown in FIG. 5. In this schematic diagram, the incoming video signal is supplied to an input terminal 40 and then is coupled to combining circuit 12 via an automatic gain control (AGC) circuit 41 and a clamp circuit 42, as is conventional. Clamp circuit 42 functions to clamp, or reference the video signal either to the tip of the synchronizing signal or, if desired, to the pedestal level of the video signal. However, since the time constant of the clamp circuit is relatively high, as is conventional, the clamp circuit is not effective to remove alternations in the average level of the video signal from line-to-line.

A pre-emphasis circuit 43, comprised of an emitter-follower transistor 44 connected in cascade with an amplifying transistor 45, couples the clamped video signal to combining circuit 12. A resonant circuit 46 is connected in parallel with the emitter resistor of transistor 45.

Switching circuits 21 and 22 are comprised of transistors 48 and 49, respectively. The emitter electrodes of these transistors are connected in common to the emitter electrode of a control transistor 47. The base electrode of transistor 47 is connected to the output of pre-emphasis circuit 43, that is, to the collector electrode of amplifying transistor 45. Hence, depending upon which of transistors 48 and 49 is conductive, the clamped, pre-emphasized video signal is supplied therethrough to integrating circuits 23 and 24. The base electrode of transistor 48 is supplied with switching signal $S_1$; and the base electrode of transistor 49 is supplied with switching signal $S_2$. These switching signals are produced by flip-flop circuit 32, which is shown as being formed of cross-coupled transistors 50 and 51 whose base electrodes are connected through diodes to the output of a differentiating circuit to which the separated horizontal synchronizing pulses $S_H$ are supplied. Switching signal $S_1$, which is derived from the collector electrode of transistor 51, also is supplied as the control signal to change-over switch 30. As in the previously discussed embodiments, change-over switch 30 is diagramatically represented as an electromechanical switch. It is appreciated that, in a practical embodiment thereof, the change-over switch may be formed of conventional solid-state switching elements.

Integrating circuits 23 and 24 are illustrated as RC circuits whose outputs are coupled to the base electrodes of transistors 52 and 53, these transistors being connected in differential relation to form differential amplifier 25. The base electrode of transistor 52 may comprise the "+" input of the differential amplifier and the base electrode of transistor 53 may be comprise the "−" input. The collector electrode of transistor 52 comprises the "−" output and is coupled to an integrating circuit 55, shown herein as an RC circuit. The collector electrode of transistor 53 comprises the "+" output of differential amplifier 25 and is coupled to an integrating circuit 54, which also is shown as an RC circuit. The outputs of integrating circuits 54 and 55 are coupled to respective inputs of change-over switch 30. The output of this change-over switch is coupled to the emitter electrode of a transistor 56 included in combining circuit 12. The collector electrode of transistor 56 is connected to the collector electrode of transistor 45, whereby the compensating signal which is supplied to the emitter electrode of transistor 56 by change-over switch 30 is added to the clamped, pre-emphasized video signal produced at the collector electrode of transistor 45. Thus, the video signal is compensated, and this compensated signal is supplied to FM modulator 15. As shown, the output of modulator 15 is applied to a recording transducer 60.

In the schematic diagram of FIG. 5, the outputs of differential amplifier 25 may be coupled to limiter circuits similar to limiters 26 and 27, discussed above with respect to the embodiment of FIG. 3. To this effect, a pair of parallelconnected oppositely poled diodes may be connected between the collector electrodes of transistors 52 and 53.

The operation of the embodiment shown in FIG. 5 is substantially similar to the previously described operation of the embodiment of FIG. 3. Hence, in the interest of brevity, further description thereof is not provided. One of ordinary skill in the art will readily appreciate the manner in which each of the respective circuits shown herein in detail operates. Transistor 56, included in combining circuit 2, preferably functions as a constant current source to supply a bias current having a magnitude determined by the compensating signal applied thereto from change-over switch 30. This bias current is added to the clamped, pre-emphasized video signal, and the resultant compensated video signal is supplied to FM modulator 15.

While the present invention has been particularly shown and described with reference to certain preferred embodiments, it will be readily appreciated by those of ordinary skill in the art that various changes and modifications in form and detail may be made without departing from the spirit and scope of the invention. For example, the schematic diagram illustrated in FIG. 5 merely is representative of one particular embodiment of the video signal processing circuitry of this invention. Various equivalent transistor devices may be used to replace the illustrated NPN and PNP transistors. Also, the various circuit elements, such as combining circuit 12, switching circuits 21 and 22, integrating circuits 23 and 24, differential amplifier 25, change-over switch 30, flip-flop flip-flop circuit 32 and pre-emphasis circuit 43 may admit of other known construction. It is, therefore, intended that the appended claims be interpreted as including such other changes and modifications.

What is claimed is:

1. Video signal processing circuitry for compensating a video signal having different average levels in alternate horizontal line intervals thereof, comprising first average detecting means operable during alternate ones of said line intervals for detecting the average level of the video signal in said alternate line intervals; second average detecting means operable during the remaining ones of said line intervals for detecting the average level of the video signal in said remaining line intervals; compensating means responsive to the difference between said detected average levels of the video signal in said alternate and remaining line intervals, respectively, for producing compensating signals; and combining means for combining said compensating signals with said video signal so as to minimize the difference between the average level of the video signal in successive line intervals.

2. The circuitry of claim 1 wherein said first average detecting means comprises first switch means operable during n, n+2, ... line intervals to pass said video signal therethrough, and first integrating means to provide a first time integral of the video signal passed by said first switch means to represent the average level of said passed video signal; and wherein said second average detecting means comprises second switch means operable during n+1, n+3, ... line intervals to pass said video signal therethrough, and second integrating means to provide a second time integral of the video signal passed by said second switch means to represent the average level of said passed video signal; and wherein n is an integer.

3. The circuitry of claim 2 wherein said compensating means comprises a differencing circuit having a pair of inputs coupled to said first and second integrating means for receiving said first and second time integrals of said video signal, respectively, and a pair of outputs for producing a difference signal representing the difference between said first and second time integrals and an inverted version of said difference signal, respectively; and change-over switch means coupled to said pair of outputs for alternately supplying said difference signal and said inverted version of said difference signal to said combining means.

4. The circuitry of claim 3 further comprising switch control means for separating the horizontal synchronizing signal from said video signal and for generating a switch control signal having an amplitude which undergoes a transition at each horizontal line interval to operate one and then the other of said first and second switch means at successive line intervals and to operate said change-over switch means to supply said difference signal and said inverted version of said difference signal to said combining means at successive line intervals.

5. The circuitry of claim 3 or 4 wherein said combining means comprises an adding circuit, and wherein said change-over switch means supplies said inverted version of said difference signal to said adding circuit when said first switch means passes said video signal to said first integrating means and supplies said difference signal to said adding circuit when said second switch means passes said video signal to said second integrating means.

6. The circuitry of claim 3 or 4 wherein said combining means comprises a subtracting circuit for subtracting said compensating signals from said video signal, and wherein said changeover switch means supplies said difference signal to said subtracting circuit when said first switch means passes said video signal to said first integrating means and supplies said inverted version of said difference signal to said subtracting circuit when said second switch means passes said video signal to said second integrating means.

7. The circuitry of claim 3 or 4 wherein said compensating means further comprises a limiting circuit and an integrating circuit connected in series between one output of said differencing circuit and said change-over switch means, and a limiting circuit and an integrating circuit connected in series between the other output of said differencing circuit and said change-over switch means; the time constant of each of said integrating circuits being greater than the time constant of each of said first and second integrating means.

8. The circuitry of claim 1, 2, 3 or 4 wherein the output of said combining means is connected in feedback relation to said first and second average detecting means to supply the compensated video signal thereto.

9. Video signal processing circuitry for use in a video signal recorder to compensate at least the luminance component of a composite color video signal having different average levels in alternate horizontal line intervals thereof, said circuitry comprising first and second switch means operable during odd and even line intervals, respectively, of each field or frame interval to pass at least the luminance component therethrough; first and second integrating means coupled to said first and second switch means to provide first and second time integrals of the odd and even line intervals, respectively, of at least the luminance component, each of said time integrals representing the average level of the video signal; differencing means coupled to said first and second integrating means for producing a first compensating signal which is a function of the average level of the video signal during an odd line interval less the average level of the video signal during an even line interval and for producing a second compensating signal which is a function of the average level of the video signal during an even line interval less the average level of the video signal during an odd line interval; and combining means for selectively combining said first and second compensating signals with at least the luminance component in advance of the recording thereof so as to minimize the difference between the average levels of the video signal in odd and even line intervals.

* * * * *